United States Patent
Denzinger et al.

(10) Patent No.: US 6,367,816 B1
(45) Date of Patent: Apr. 9, 2002

(54) CLAMPING DEVICE FOR OBJECTS, FOR EXAMPLE FOR WORKPIECES TO BE TREATED

(75) Inventors: Otto Denzinger, Wendlingen; Jens Schneider, Esslingen, both of (DE)

(73) Assignee: C. Stiefelmayer GmbH & Co. KG, Denkendorf (DE)

( * ) Notice: Subject to any disclaimer, the term of this patent is extended or adjusted under 35 U.S.C. 154(b) by 0 days.

(21) Appl. No.: 09/563,357

(22) Filed: May 3, 2000

(30) Foreign Application Priority Data

May 11, 1999 (DE) .......................................... 199 21 528

(51) Int. Cl.[7] .............................................. B23B 31/19
(52) U.S. Cl. ......................... 279/141; 279/106; 279/121
(58) Field of Search ................................. 279/106, 110, 279/121, 141, 127; 82/165

(56) References Cited

U.S. PATENT DOCUMENTS

| | | | | |
|---|---|---|---|---|
| 1,412,170 A | * | 4/1922 | Dixon ........................ | 279/141 |
| 1,881,905 A | * | 10/1932 | Page et al. .................. | 279/106 |
| 2,733,072 A | * | 1/1956 | Hohwart et al. ............. | 279/106 |
| 2,893,744 A | * | 7/1959 | Anthony ..................... | 279/141 |
| 3,420,538 A | * | 1/1969 | Benjamin et al. ............ | 279/106 |
| 4,838,561 A | * | 6/1989 | Baranzelli et al. ........... | 279/127 |

FOREIGN PATENT DOCUMENTS

| JP | 363267106 A | * | 11/1988 | .................. 279/141 |
|---|---|---|---|---|

* cited by examiner

Primary Examiner—Steven C. Bishop
(74) Attorney, Agent, or Firm—Michael J. Striker

(57) ABSTRACT

A clamping device for objects such as workpieces to be treated and the like has a base body having at least one abutment surface for at least one object to be clamped, at least one clamping finger located on a movable carrier and having at least one clamping surface for at least one object to be clamped, so that a clamping force for clamping the at least one object is applied between the abutment surface and the clamping surface, an actuating element in operative connection with the at least one carrier for applying a clamping force in a clamping direction and opposite to it so that the carrier with the clamping finger being movable in a direction substantiallytransverse to the clamping direction relative to the actuating element, and a bearing block in which the carrier with the clamping finger is held movably relative to the bearing block, the bearing block being displaceble in the base body substantially transversely to the clamping direction.

24 Claims, 2 Drawing Sheets

CLAMPING DEVICE FOR OBJECTS, FOR EXAMPLE FOR WORKPIECES TO BE TREATED

BACKGROUND OF THE INVENTION

The present invention relates to a clamping device for objects, for example for workpieces to be treated.

Clamping devices are known in the art. They have various designs and are produced in many modifications. It is understood that the existing clamping devices can be further improved.

SUMMARY OF THE INVENTION

Accordingly, it is an object of the present invention to provide a clamping device for objects, for example for workpieces to be treated, which is formed so that at least one carrier with a clamping finger is adjustable automatically transversely to a clamping direction for example radially to a corresponding position which is designed for clamping.

When the clamping device is designed in accordance with the present invention, it is possible to provide adaptation to the corresponding objects to be clamped without special expensive adjusting works and automatically by performing a transverse movement of the at least one carrier with a clamping finger to a standard position required for the clamp. This is achieved in a simple manner by a fixed abutment which limits the transverse adjusting movement. The fixed abutment is exchangeably mounted on a base body and is adapted to the dimensions of the object to be clamped, for example for circular workpieces to be clamped it is adjusted to the workpiece diameter.

It is advantageous that the fixed abutment simultaneously serves as an abutment for the corresponding object to be clamped, and the fixed abutment has an abutment surface for the object to be clamped.

The at least one carrier with the end-side clamping finger can be displaced during the application of the clamping force for clamping not only axis-parallel. It can also perform additional turning movements in a simple manner by the design of an outer nut during the axial movement for clamping and releasing.

The clamping device which is designed in accordance with the present invention is simple, reliable in operation and cost saving.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection With the accompanying drawings.

DESCRIPTION OF PREFERRED EMBODIMENTS

Figure 1:
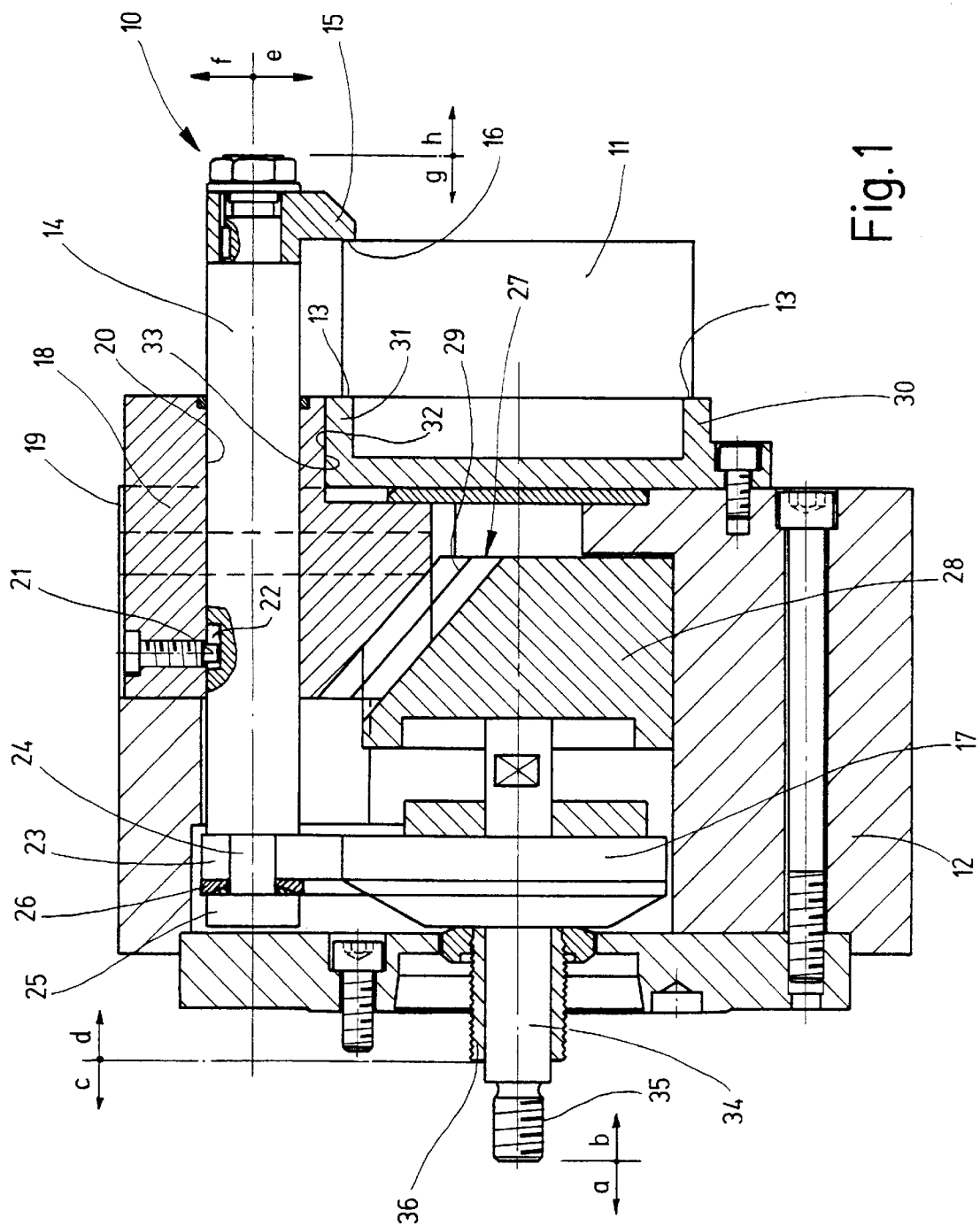
FIG. 1 is a view showing a schematic section of a clamping device for objects in accordance with the present invention.
Figure 2:
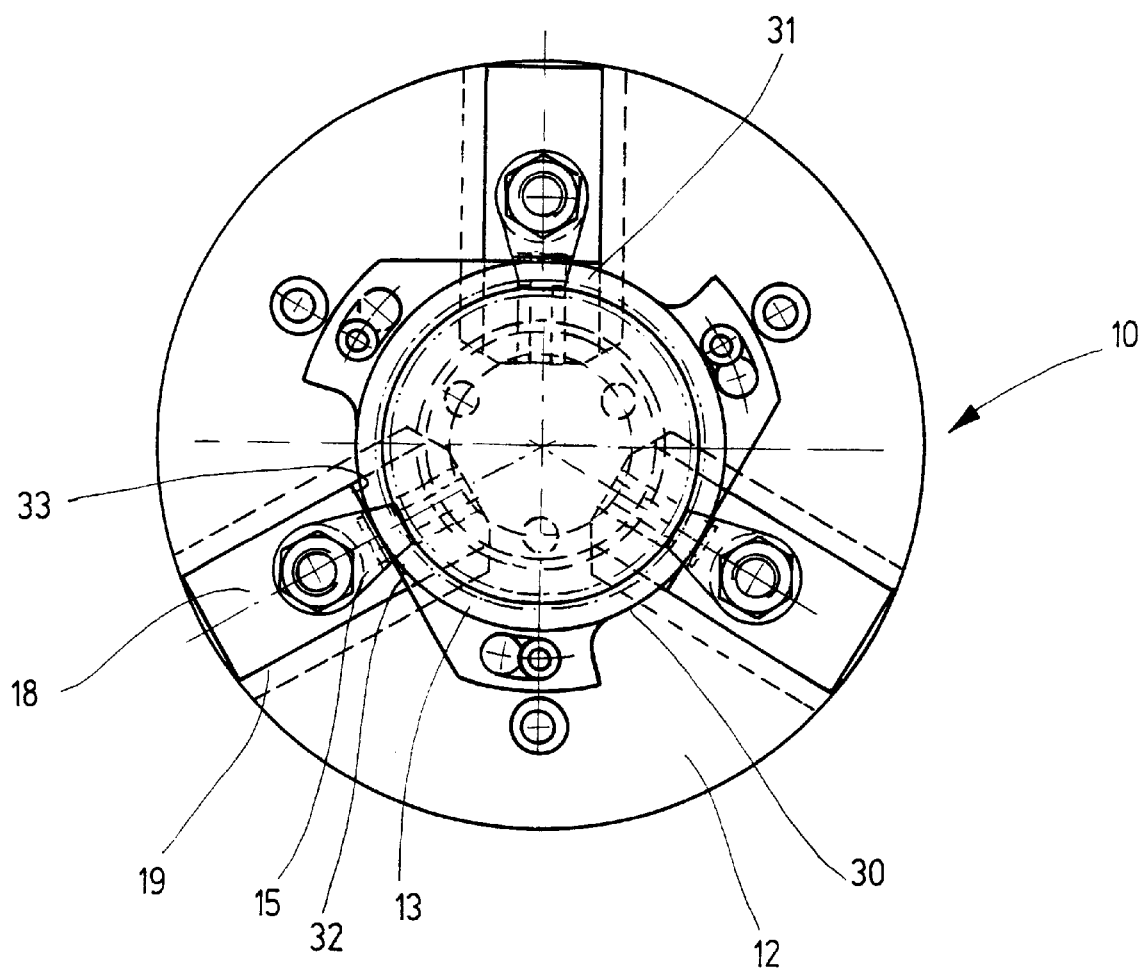
FIG. 2 is a view is a side view of the inventive clamping device shown in FIG. 1.

A clamping device in accordance with the present invention is identified as a whole with reference numeral 10 and is provided for clamping of objects 11, for example workpieces to be treated. The object 11 can be formed as a single part or can be assembled of individual parts, for example of several parts which are packed or clamped together in a packet.

The clamping device 10 is arranged for example in a conventional manner on a not shown machine, for example treatment machine. The clamping device 10 has a base body which is identified as a whole with reference numeral 12. It can have any shape and in the shown embodiment is formed as a round body. The base body 12 is a carrier of at least one abutment surface 13 which will be described herein below, and which forms the abutment surface for at least one object 11 to be clamped. A part of the clamping device 10 is at least one carrier 14 provided with an exchangeably held clamping finger 15. The clamping finger is located on the side facing the abutment surface 13 with at least one clamping surface 16 for the object 11 to be clamped. The clamping force applied for clamping of the object 11 is acting between the abutment surface 13 and the clamping surface 16. The clamping device shown in FIG. 1 extends substantially in a horizontal direction.

The at least one carrier 14 with the clamping finger 15 is connected with an actuating element 17 for applying the clamping force in a clamping direction and opposite to it. During actuation of the actuating element 17 in direction C or D, the carrier 15 is displaced in a horizontal direction to one or another side. The actuation of the actuating element 17 in direction of the arrow C provides the clamping of the object 11 between the clamping surface 16 and the abutment surface 13. An opposite movement of the actuating element 17 in the arrow direction D results in releasing of the clamping.

At least one carrier 14 also is movable relative to the mounting element 17 in direction substantially transversely to the clamping direction, in the illustration in FIG. 1 upwardly or downwardly. Furthermore, the carrier 14 is held in a bearing block 18 movably relative to it. It is held in turn in a slot 19 in the base body 12 displaceably in direction substantially transversely to the clamping direction.

The at least one carrier 14 is displaceable in the shown embodiment substantially parallel to the clamping direction or in other words in a substantially horizontal direction in FIG. 1, in the bearing block 18.

Moreover, it is held non-rotatably relative to the bearing block 18. The bearing block 18 has a longitudinal opening 20, in which the carrier 14 formed as a rod is received in a horizontally displaceable fashion. The bearing block 18 has a blocking projection 21, for example formed as a screw with a projection which engages in an outer groove 22 of the carrier 14. In the shown embodiment, the outer groove 22 has a portion which extends substantially parallel to the longitudinal axis of the carrier 14. The blocking projection 21 engages in it and thereby the non-rotatable holding is obtained.

In accordance with another not shown embodiment, the carrier 14 can be held relative to the bearing block 18, in addition to the longitudinal displaceability, also turnably around the axis of the carrier 14. The outer groove 22 can have for example a portion which is inclined or arcuate and/or substantially parallel to its longitudinal axis. The inclined or arcuate portion cooperates during the longitudinal displacement of the carrier 14 with the blocking projection 21 to provide a turning and/or longitudinal displacement of the carrier 14 relative to the bearing block 18. Thereby the axial movement for clamping or releasing is superposed with an additional turning movement.

The actuating element 17 is provided for each carrier 14 with a slot 23 which extends transversely to the clamping direction, or in other words vertical in FIG. 1. An end part 24 of the carrier 14 extends through it with a gap. The end part 24 of the carrier 14 is supported relative to the actuating element 17 preferably in a swinging way in a horizontal direction. The end part 24 with a surface located at the right in FIG. 1 lies on a surface which extends at both sides of the slot 23, on the actuating element 17. At the opposite side, the end part 24 has a head 25 which abuts through a spherical-segment shaped support 26 axially against the facing side of the actuating element 17.

The clamping device 10 has a transverse adjustment device 27 operating on at least one bearing block 18. It has a displacing member 28 which faces the bearing block 18. The displacing member 28 is guided relative to the base body 12 substantially parallel to the clamping device, or substantially horizontal in FIG. 1. The bearing block 18 is guided on the displacing member 28 along a guiding surface 29 which extends inclined toward the clamping direction, in FIG. 1 inclined from above downwardly and from left to right. This inclined guiding surface 29 is designed in accordance with the wedge-hook principle and forms for example a dove-tail guide.

A fixed abutment 30 is exchangeably mounted, for example screwed, on the base body 12 for forming the abutment surface 13. This fixed abutment 30 faces a corresponding object 11 to be clamped and is adapted to it. This adaptation is performed both with respect to the shape and the dimensions. In the shown embodiment, the fixed abutment 30 is substantially cap-shaped and corresponds to a lying U. Its ring end surface which is at the right side in FIG. 1 forms the abutment surface 13. In another not shown embodiment for example for differently shaped and/or dimensioned object 11, the fixed abutment 30 is designed in a different way to be adapted to the object. It serves as an abutment for the object 11. The fixed abutment 30 has a portion 31 with an abutment surface 32 which faces the at least one bearing block 18. In association with it, the at least one bearing block 18 is provided with a surface 33 which faces the abutment surface 32. With this surface the bearing block 18 in its adjustment position abuts by means of the transverse displacement device 27 against the abutment surface 32 so as to reach the standard outlet position associated with the object 11 to be clamped. The abutment surface 32 and the associated surface 33 of the at least one bearing block 18 extends substantially parallel to the clamping direction. Its abutment cooperation is provided transversely to the clamping device.

The actuating element 17 is displaceable relative to the displacing member 28 and independently from the latter in a translatory movement. The actuating element 17, on the one hand and the displacing member 28 on the other hand are each associated with a drive for corresponding actuation, in particular a pressure-medium actuated working cylinder which is not shown in detail. The displacing member 28 is provided with a rod 34 with an end 35 engaged by the above described drive. The rod 34 extends through the actuating element 17. In turn, the actuating element 17 is displaceable by a sleeve 36 on the rod 34 relative to it, and the drive associated with the actuating element 17 can engage the sleeve 36. The actuating element 17 can be held swingingly relative to its sleeve 36.

The clamping device 10 can be formed as an elongated structure substantially resembling a flat bed. The individual surfaces which are in contact with one another can be formed by corresponding flat sides.

In the shown embodiment, the clamping device 10 is formed as a rotation-symmetrical structure, which is however not absolutely necessary. The actuating element 17 is formed for this purpose as a ring part with at least one projecting finger which is held in a radial slot 23. A displacing member 28 is composed of a disk. The base member 12 has several, for example three bearing blocks 18 which are distributed in a peripheral direction over identical angular distances. Each bearing block 18 has one carrier 14 with the clamping finger 15, so that in the case of a round object 11 to be clamped, the clamping force acts on several, for example three, locations which are distributed in a peripheral direction, preferably over same angular distances.

When via the rod 34 the displacing member 28 is moved in an axial direction of arrow A for example to the left in FIG. 1, then the at least one bearing block 18 is moved in a radial direction of arrow e for example downwardly in FIG. 1. An opposite movement of the displacing member 28 in direction of the arrow e results in an opposite displacement of the bearing block 18 and the arrow direction f, for example upwardly in FIG. 1. Since the corresponding carrier 14 with the end-side clamping finger 15 it is supported in the corresponding bearing block 18, the carrier 14 with the clamping finger 15 moves during the radial movement of the bearing block 18 in a radial direction. The desired position of the end-side clamping finger 18 which is dependent for example from the diameter of the object 11 to be clamped, is obtained by applying and mounting on an associated suitable fixed abutment 30 which acts as an abutment for the object 11. Also, the position can be achieved through a fixation of the movement of the displacing member 28.

By actuation of the actuating element 17 in axial direction of arrow c, for example to the left in FIG. 1, the corresponding carrier 14 is displaced with the end-side clamping finger 15 in the same direction relative to the bearing block 18 and therefore in the arrow direction g in FIG. 1 to the left. This results in the clamping of the inserted object 11. As described in connection with the shape of the outer groove 22, with the corresponding design of the outer groove 22 or its portion it is possible to perform not only a horizontal translation movement of the carrier 14 during the axial movement for clamping and releasing, but also additional turning movements.

By movement of the actuating element 17 in direction of the arrow d, for example to the left in FIG. 1, the clamping is released. Depending on the procedure during unloading of the object 11, either the displacing member 28 can be displaced in direction b or in other words to the right in FIG. 1 so that the bearing block 18 is moved radially outwardly and together the corresponding carrier 14 with the clamping finger 15 contained in it is moved radially outwardly, or the displacing member 28 is left in the position and is first moved when another object 11 with a different diameter must be clamped. During actuation of the corresponding bearing block 18 over the translation movement of the displacing member 28, automatically the radial position associated with clamping of the object 11 is obtained, since during the displacement of the displacing member 28 to the left in FIG. 1, the corresponding bearing block 18 is moved radially inwardly so far, until it abuts with its surface 33 against the abutment surface 32 of the fixed abutment 30. Thereby automatically and without adjustment works, the corresponding radial position for the corresponding clamping finger 18 is reached, which is required in adaptation to the object 11 to be clamped. The radially inwardly oriented movement of the corresponding bearing block 11 is achieved through a not shown force element which acts in this direction on the corresponding bearing block 18. It can be formed for example by a spring force or for example by a pressure-operated working cylinder.

It will be understood that each of the elements described above, or two or more together, may also find a useful application in other types of constructions differing from the types described above.

While the invention has been illustrated and described as embodied in clamping device for objects, for example for workpieces to be treated, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A clamping device for objects to be treated, comprising a base body having at least one abutment surface for at least one object to be clamped; at least one clamping finger located on a movable carrier and having at least one clamping surface for at least one object to be clamped, so that a clamping force for clamping the at least one object is applied between said abutment surface and said clamping surface; an actuating element in operative connection with said at least one carrier for applying a clamping force in a clamping direction and opposite to it, so that said carrier with said clamping finger being movable in a direction substantially transverse to the clamping direction relative to said actuating element; and a bearing block in which said carrier with said clamping finger is held movably relative to said bearing block, said bearing block being displaceble in said base body substantially transversely to the clamping direction.

2. A clamping device as defined in claim 1, wherein said at least one carrier is held in said bearing block displaceably substantially parallel to the clamping direction.

3. A clamping device as defined in claim 1, wherein said at least one carrier is held non-rotatably relative to said bearing block.

4. A clamping device as defined in claim 1, wherein said at least one carrier is held in said bearing block movably with a movement selected from the group consisting of turning around its longitudinal axis, a longitudinal displacement, and both.

5. A clamping device as defined in claim 1, wherein said bearing block has a longitudinal opening in which said carrier formed as a rod is moveably received.

6. A clamping device as defined in claim 1, wherein said bearing block has a blocking projection which formed-lockingly engages in an outer groove of said carrier.

7. A clamping device as defined in claim 6, wherein said outer groove of said carrier has a portion selected from the group consisting of an inclined portion, an arcuate portion, a portion extending substantially parallel to a longitudinal axis, and a combination thereof, said blocking projection cooperating with said portion so that during a longitudinal displacement of said carrier it performs relative to said bearing block a movement selected from the group consisting of a turning movement, a longitudinal displacement, and both.

8. A clamping device as defined in claim 1, wherein said actuating element per each carrier has a slot extending transversely to the clamping direction, said carrier having an end part extending through said slot with a gap therebetween.

9. A clamping device as defined in claim 8, wherein said end part of said carrier being supported in a swinging manner on said actuating element.

10. A clamping device as defined in claim 1; and further comprising a transverse adjustment device operating in said at least one bearing block.

11. A clamping device as defined in claim 10, wherein said transverse adjusting device has a displacing member associated with said bearing block and guided relative to said base body substantially parallel to the clamping direction, said bearing block being guided on said displacing member longitudinally on a guiding surface extending inclinedly to the clamping direction.

12. A clamping device as defined in claim 1; and further comprising a fixed abutment which is exchangeably mounted on said base body for forming an abutment surface, said fixed abutment being arranged to the object to be clamped and adapted to it.

13. A clamping arrangement as defined in claim 12, wherein said fixed abutment has a portion with an abutment surface facing said at least one bearing block and a surface facing said at least one bearing block, with which said bearing block abuts during its adjustment by means of said transverse adjusting device against an abutment surface so as to provide a standard outlet position for the object to be clamped.

14. A clamping arrangement as defined in claim 13, wherein said abutment surface and the associated surface from the at least one bearing block extends substantially parallel to the clamping direction and their abutment cooperation is performed transversely to the clamping direction.

15. A clamping arrangement as defined in claim 11, wherein the inclinedly extending guiding surface is formed in accordance with a wedge-hook principle.

16. A clamping arrangement as defined in claim 15, wherein said inclinedly extending guiding surface is formed as a dove-tail guide.

17. A clamping arrangement as defined in claim 11, wherein said actuating element is actuatable relative to said displacing member and independently from it in a translational movement.

18. A clamping arrangement as defined in claim 1; and further comprising drive means including a drive for said actuating element and a drive for said displacing member.

19. A clamping arrangement as defined in claim 18, wherein each of said drives is formed as a pressure-medium-actuated working cylinder.

20. A clamping arrangement as defined in claim 1, wherein said actuating element is formed as a ring part with at least one finger arranged in a slot.

21. A clamping arrangement as defined in claim 11, wherein said displacing member is formed as a disk.

22. A clamping arrangement as defined in claim 1, wherein said base body has a plurality of bearing blocks which are uniformly distributed in a peripheral direction at identical peripheral angles and each having a carrier with a clamping finger.

23. A clamping arrangement as defined in claim 22, wherein said base body has three such bearing blocks.

24. A clamping arrangement as defined in claim 12, wherein said fixed abutment is substantially cup shaped and forming as a lying U so that its ring end surfaces form said abutment surfaces.

* * * * *